United States Patent
Ishizuka

(10) Patent No.: US 7,952,773 B2
(45) Date of Patent: *May 31, 2011

(54) IMAGE FORMATION DEVICE AND SUPPORT BODY

(75) Inventor: Masahiko Ishizuka, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,857

(22) Filed: Mar. 11, 2010

(65) Prior Publication Data

US 2010/0172681 A1 Jul. 8, 2010

Related U.S. Application Data

(63) Continuation of application No. 11/517,329, filed on Sep. 8, 2006, now Pat. No. 7,710,616.

(30) Foreign Application Priority Data

May 23, 2006 (JP) ................................ 2006-142764

(51) Int. Cl.
*H04N 1/04* (2006.01)

(52) U.S. Cl. ...................... 358/498; 358/401; 399/107

(58) Field of Classification Search .................. 358/400, 358/401, 474, 498, 305; 399/107; D18/50, D18/55, 59
See application file for complete search history.

(56) References Cited

U.S. PATENT DOCUMENTS

| 7,710,616 B2 * | 5/2010 | Ishizuka ....................... 358/498 |
| 2001/0009619 A1 | 7/2001 | Kida |
| 2001/0010770 A1 | 8/2001 | Kominato |
| 2007/0122184 A1 | 5/2007 | Syring et al. |

FOREIGN PATENT DOCUMENTS

| JP | 2002-154705 A | 5/2002 |
| JP | 3392429 B2 | 1/2003 |
| KR | 10-2002-0062226 A | 7/2002 |
| KR | 10-2005-0019007 A | 2/2005 |

* cited by examiner

*Primary Examiner* — Thomas D Lee
(74) *Attorney, Agent, or Firm* — Sughrue Mion, PLLC

(57) ABSTRACT

An image formation device is provided with an image formation section, an image acquisition section, a paper supply cassette and a support body. The image formation section forms images at a recording medium and is supported at a base surface. The image acquisition section is disposed at an upper side of the image formation section. The paper supply cassette is disposed at a lower side of the image formation section and can be drawn out to a near side. The support body supports the image acquisition section at the base surface and forms a cassette cavity which is capable of accommodating a far side of the paper supply cassette.

25 Claims, 10 Drawing Sheets

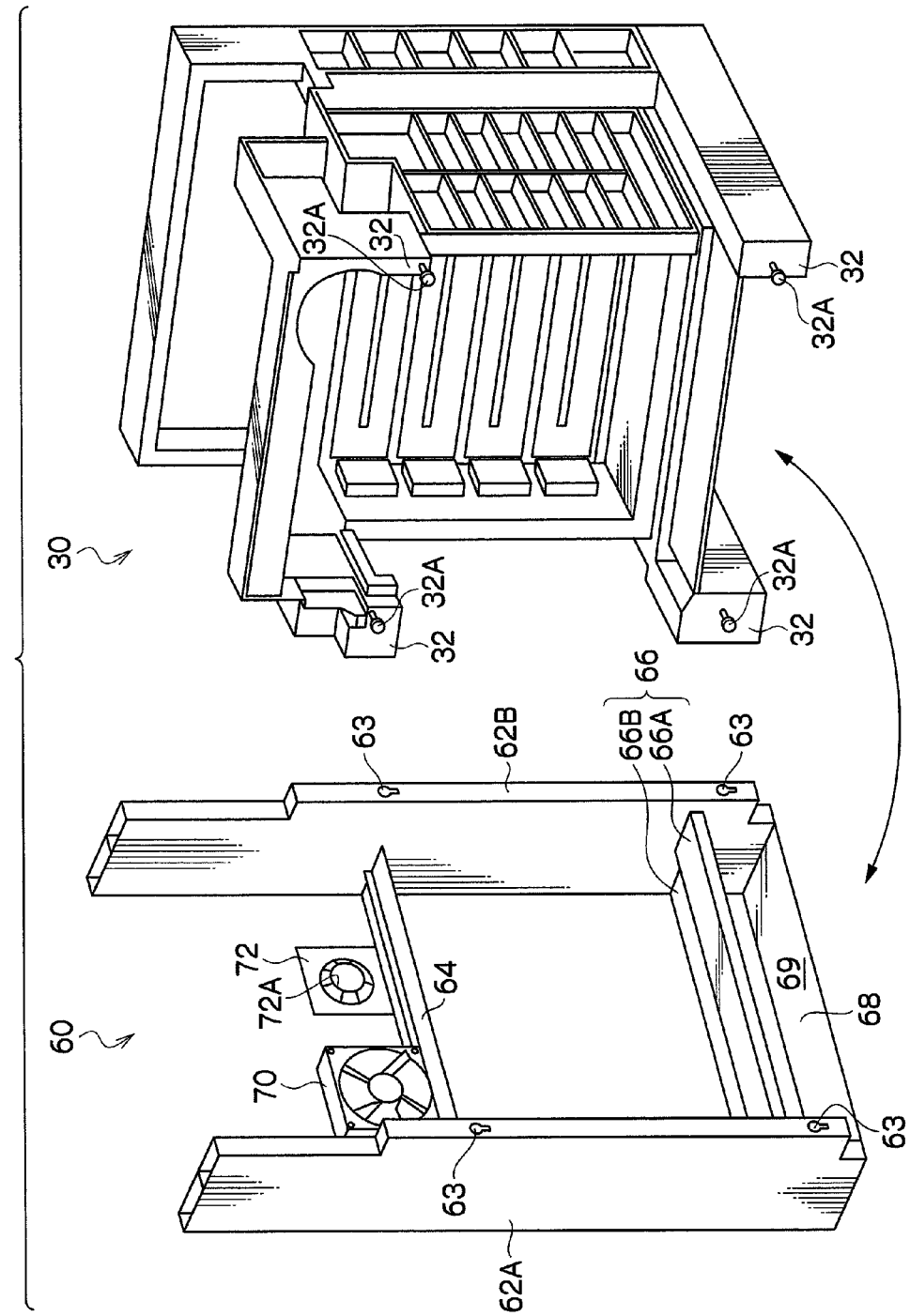

IMAGE FORMATION DEVICE AND SUPPORT BODY

CROSS-REFERENCE TO RELATED APPLICATION

This is a continuation of application Ser. No. 11/517,329, filed Sep. 8, 2006, which claims priority under 35 USC 119 from Japanese Patent Application No. 2006-142764. The entire disclosures of the prior applications are incorporated by reference herein.

BACKGROUND

1. Technical Field

The present invention relates to a support body for supporting an image formation section and an image acquisition section, and to an image formation device.

2. Related Art

Heretofore, image formation devices have been proposed in which an image acquisition device is disposed upward of an image formation unit and a paper supply cassette is disposed at a lower side of the image formation unit.

SUMMARY

An image formation device of a first aspect of the present invention includes: an image formation section which forms an image at a recording medium and is supported at a base surface; an image acquisition section which is disposed at an upper side relative to the image formation section; a paper supply cassette which is disposed at a lower side relative to the image formation section and can be drawn out to a near side; and a support body which supports the image acquisition section at the base surface and forms a cassette cavity capable of accommodating a far side of the paper supply cassette.

In an image formation device with the structure described above, the image acquisition section is supported at the base surface by the support body. Here, the base surface may be a floor face, and may be a surface of a platform which is mounted on casters so as to be movable. Further, the cassette cavity which is capable of accommodating the far side of the paper supply cassette is structured by the support body. Therefore, if a longitudinal (front-rear) direction length of the paper supply cassette is long, the far side of the paper supply cassette will be accommodated in the cassette cavity.

BRIEF DESCRIPTION OF THE DRAWINGS

An exemplary embodiment of the present invention will be described in detail based on the following figures, wherein:

FIG. 5 is a schematic perspective view of a support body and a frame of the present embodiment;

DETAILED DESCRIPTION

Herebelow, a best embodiment of the present invention will be described in detail with reference to the drawings.

Figure 1:
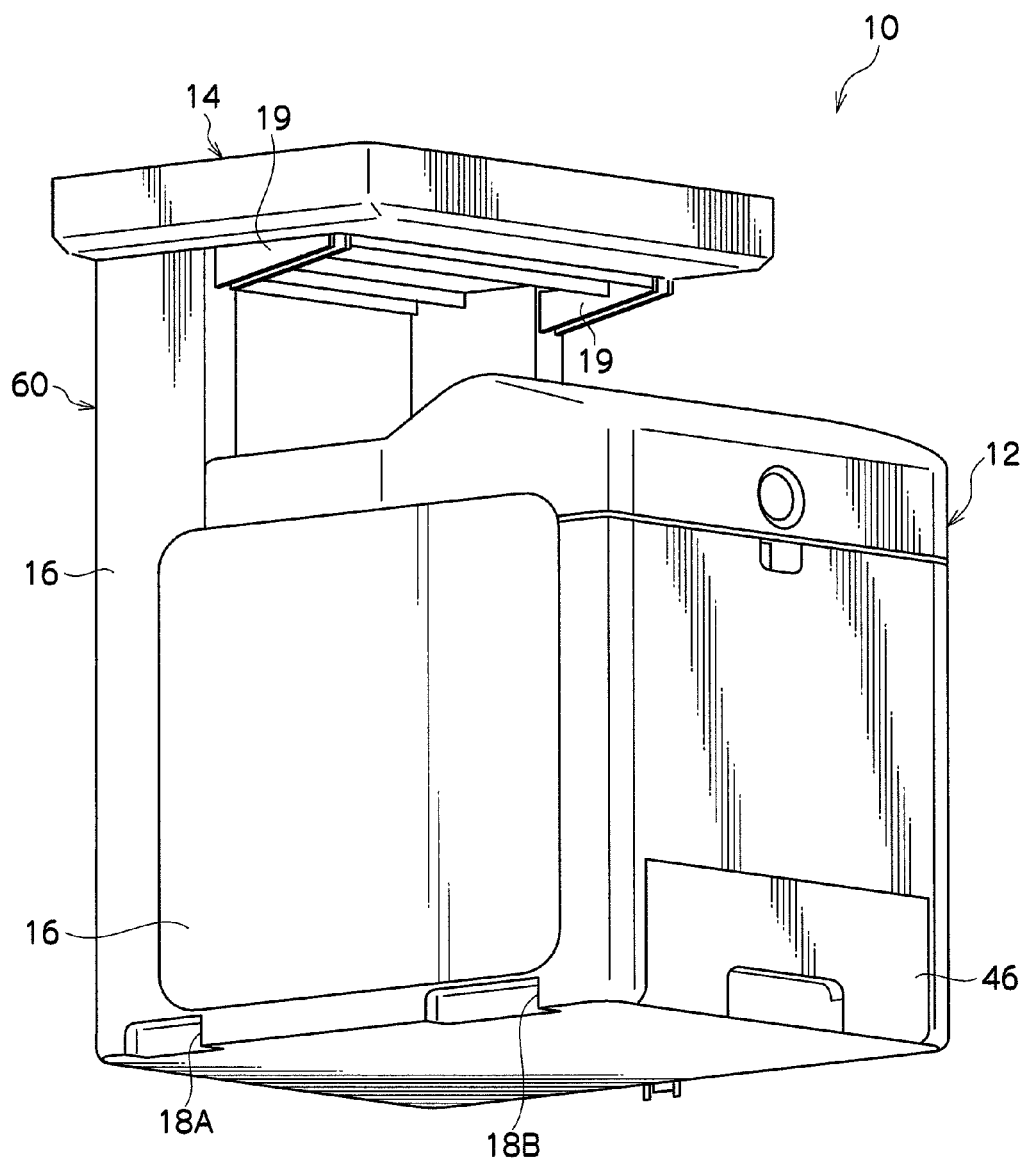
FIG. 1 is a perspective view showing the exterior of an image formation device of the present embodiment.

As shown in FIG. 1, an image formation device 10 relating to the present invention is provided with an image formation section 12, an image acquisition section 14 and a support body 60.

Figure 2:
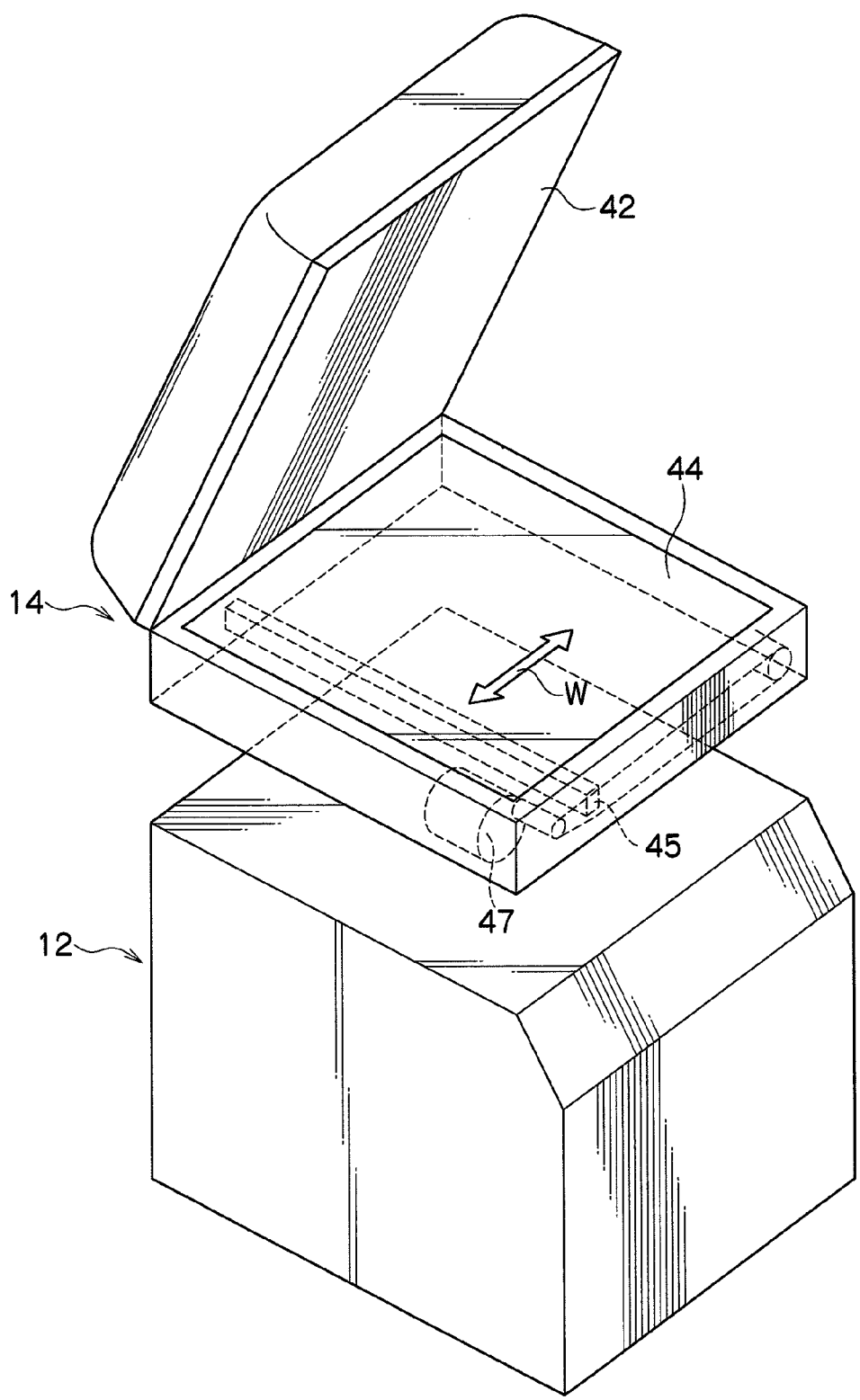
FIG. 2 is a perspective view showing exteriors of an image acquisition section and an image formation section of the image formation device of the present embodiment.

The image acquisition section 14 is disposed at an upper side of the image formation section 12 with a gap therebetween. As shown in FIG. 2, the image acquisition section 14 is provided with a lid board 42. The lid board 42 is capable of opening and closing. Below the lid board 42, a transparent original stage 44 constituted with a platen glass or the like is provided, at an upper face of which an original will be placed. Below the original stage 44, a reading bar 45 constituted with a CCD or the like is provided, which reads the original that has been placed on the original stage 44. The reading bar 45 is formed in a long, narrow shape from a front face side to a back side, is moved in the directions of arrow W by a scanning driving mechanism 47, and acquires an image of the original that has been placed on the original stage 44. Data acquired by the reading bar 45 is memorized as image data.

Figure 3:
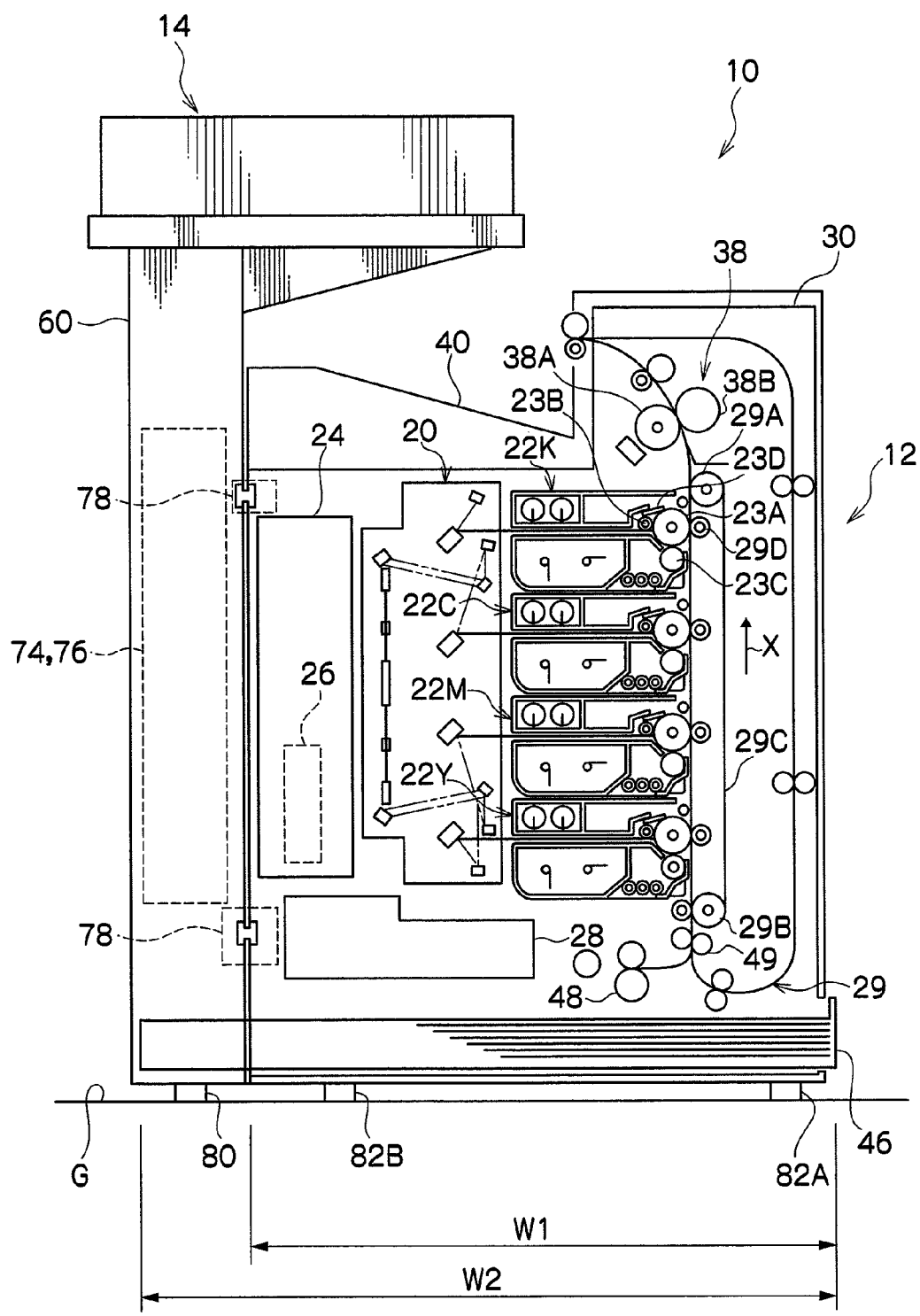
FIG. 3 is a schematic structural view showing structure of the image formation device of the present embodiment.

As shown in FIG. 3, the image formation section 12 is provided with an optics unit 20, developing units 22, a device operation control section 24, a low-voltage supply section 28, a conveyance unit 29 and a fixing section 38. The device operation control section 24 is structured with a circuit board and the like including a CPU for controlling operations of the device, of the image formation section 12, the image acquisition section 14 and so forth. A high-voltage supply section 26 is incorporated in the device operation control section 24. The image formation section 12 can be employed alone to serve as a printer. The sections structuring the image formation section 12 are arranged in the following order from a near side (the right side of FIG. 3): the conveyance unit 29, the developing units 22, the optics unit 20 and the device operation control section 24. The low-voltage supply section 28 is disposed below the optics unit 20 and the device operation control section 24, and the fixing section 38 is disposed at a portion upward of the developing units 22. These are all accommodated in a frame 30.

Each developing unit 22 is provided with a roller-form image-bearing body 23A, a charging roller 23B, a developing roller 23C and a cleaning member 23D. The charging roller 23B uniformly charges a surface of the image-bearing body 23A, and the developing roller 23C selectively transfers toner to a latent image formed on the image-bearing body 23A, to make the latent image visible. The cleaning member 23D rubs against the image-bearing body 23A and cleans off toner that remains on the image-bearing body 23A. The developing unit 22 is provided for each of the colors yellow (Y), magenta (M), cyan (C) and black (K), which are arranged in the sequence developing units 22K, 22C, 22M and 22Y from the upper side.

The optics unit 20 illuminates imaging light onto each image-bearing body 23A in accordance with image data, and forms the latent image by differences in electrostatic potentials at the surface of the image-bearing body 23A.

The image-bearing body 23A features a photosensitive layer at the surface (i.e., a peripheral face) thereof. After the surface (the peripheral face) has been uniformly charged by the charging roller 23B, the surface (the peripheral face) is exposed with laser light (imaging light) illuminated from the optics unit 20, and an electrostatic latent image (an image) is formed by potentials of exposed portions being attenuated. Herein, the charging roller 23B abuts against the image-bearing body 23A, a voltage is applied thereto, and discharges occur in a small gap in the vicinity of the abutting portion. Thus, the surface (the peripheral face) of the image-bearing body 23A is substantially uniformly charged.

The developing roller 23C is disposed so as to be close to and opposing the image-bearing body 23A, and a developing bias voltage is applied between the developing roller 23C and the image-bearing body 23A. As a result, a developing bias electric field is formed between the developing roller 23C and the image-bearing body 23A, toner carrying electric charge is transferred to portions on the image-bearing body 23A that have been exposed, and a visible image is formed.

The conveyance unit 29 is provided with a driving belt 29C, which spans between a driving roller 29A and a driven roller 29B. At an inner face side of the driving belt 29C, at predetermined positions between the driving roller 29A and the driven roller 29B, transfer rollers 29D are plurally arranged (four thereof, corresponding to the respective colors) with a predetermined spacing therebetween. Recording paper P is conveyed in the direction of arrow X by the driving belt 29C.

Each transfer roller 29D opposes the image-bearing body 23A with the driving belt 29C sandwiched therebetween, and forms a transfer electric field between the transfer roller 29D and the image-bearing body 23A. As a result, the toner image at the surface of the image-bearing body 23A (an unfixed image) is transferred onto the recording paper P, which is attracted and conveyed by the driving belt 29C and passes between the transfer roller 29D and the image-bearing body 23A.

The fixing section 38 is disposed at a downstream side in the direction of conveyance of the recording paper P relative to the developing units 22. The fixing section 38 is provided with a heating roller 38A and a pressure roller 38B, peripheral faces of which oppose one another, and which press (nip) with a predetermined pressure. An unfixed toner image which has been transferred onto the recording paper P is heated and pressed by the heating roller 38A and the pressure roller 38B, and thus the toner image is fixed to the recording paper P.

The recording paper P to which the toner image has been fixed by the fixing section 38 is ejected onto an ejection tray 40. Further, after transfer of a toner image to the recording paper P has finished, the surface (the peripheral face) of the image-bearing body 23A is subjected to cleaning processing by the cleaning member 23D, and is provided to a subsequent image creation process.

At a lower portion of the frame 30, a mountable and removable paper supply cassette 46 is provided. The paper supply cassette 46 can be drawn out in a nearward direction, and can supply suitable recording paper P. A paper supply roller pair 48 is disposed in a vicinity of a distal end portion of the paper supply cassette 46. The paper supply roller pair 48 feeds out the recording paper P from inside the paper supply cassette 46 one sheet at a time. The recording paper P which has been fed out through the paper supply roller pair 48 is fed to an attraction and conveyance surface of the driving belt 29C with a predetermined timing, by a registration roller 49, and is conveyed to transfer positions of the toner images of the respective colors.

Figure 4A:
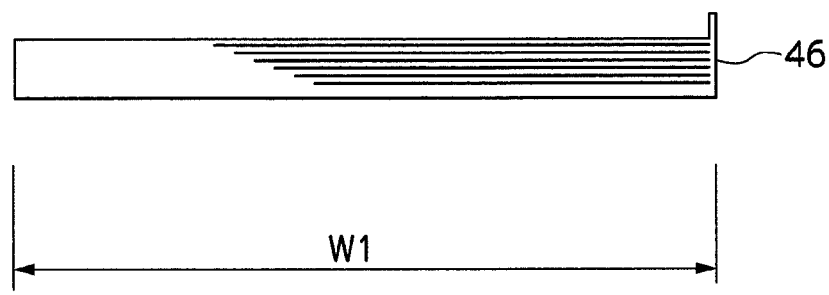
FIG. 4A is a view showing a size W1 of a paper supply cassette of the present embodiment.
Figure 4B:
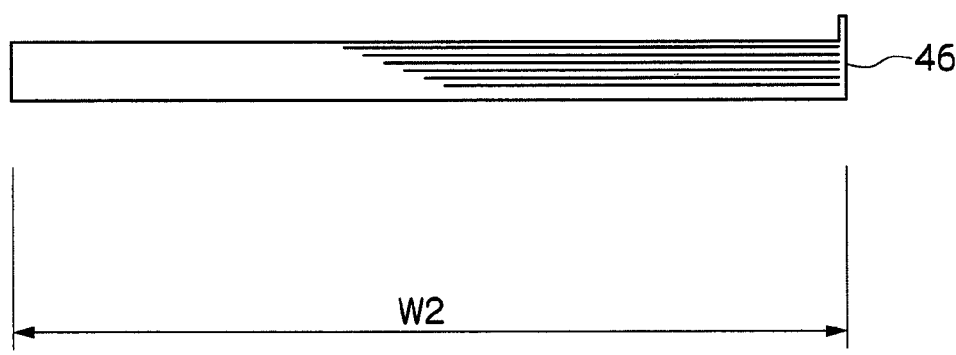
FIG. 4B is a view showing a size W2 of a paper supply cassette of the present embodiment.

As shown in FIGS. 4A and 4B, the paper supply cassette 46 may be a cassette of size W1 with a length thereof in a longitudinal (front-rear) direction of the image formation device 10 being shorter than the image formation section 12 and a rear end portion of the paper supply cassette 46 being disposed at a lower side of the frame 30, or a cassette of size W2 with a length thereof in the longitudinal direction of the image formation device 10 being longer than the image formation section 12 and the rear end portion of the paper supply cassette 46 being accommodated at the support body 60, which will be described later.

As shown in FIG. 5, the frame 30 is provided with mounting portions 32 at four corners of a rear face side thereof. The mounting portions 32 protrude in a furtherward direction, and distal end faces thereof are attached to the below-described support body 60.

The support body 60 is provided with a pair of support pillars 62A and 62B, an upper connection plate 64, a lower connection plate 66 and a floor plate 68. The support pillars 62A and 62B are provided standing in a vertical direction at the rear face side of the frame 30, with a spacing corresponding to a width of the frame 30 opened therebetween. The image acquisition section 14 is mounted at the top of the support pillars 62A and 62B. The image acquisition section 14 is supported from a floor surface G by the support pillars 62A and 62B. The support pillar 62A and the support pillar 62B are linked by the upper connection plate 64, the lower connection plate 66 and the floor plate 68, which are arranged in a horizontal direction.

Figure 6:
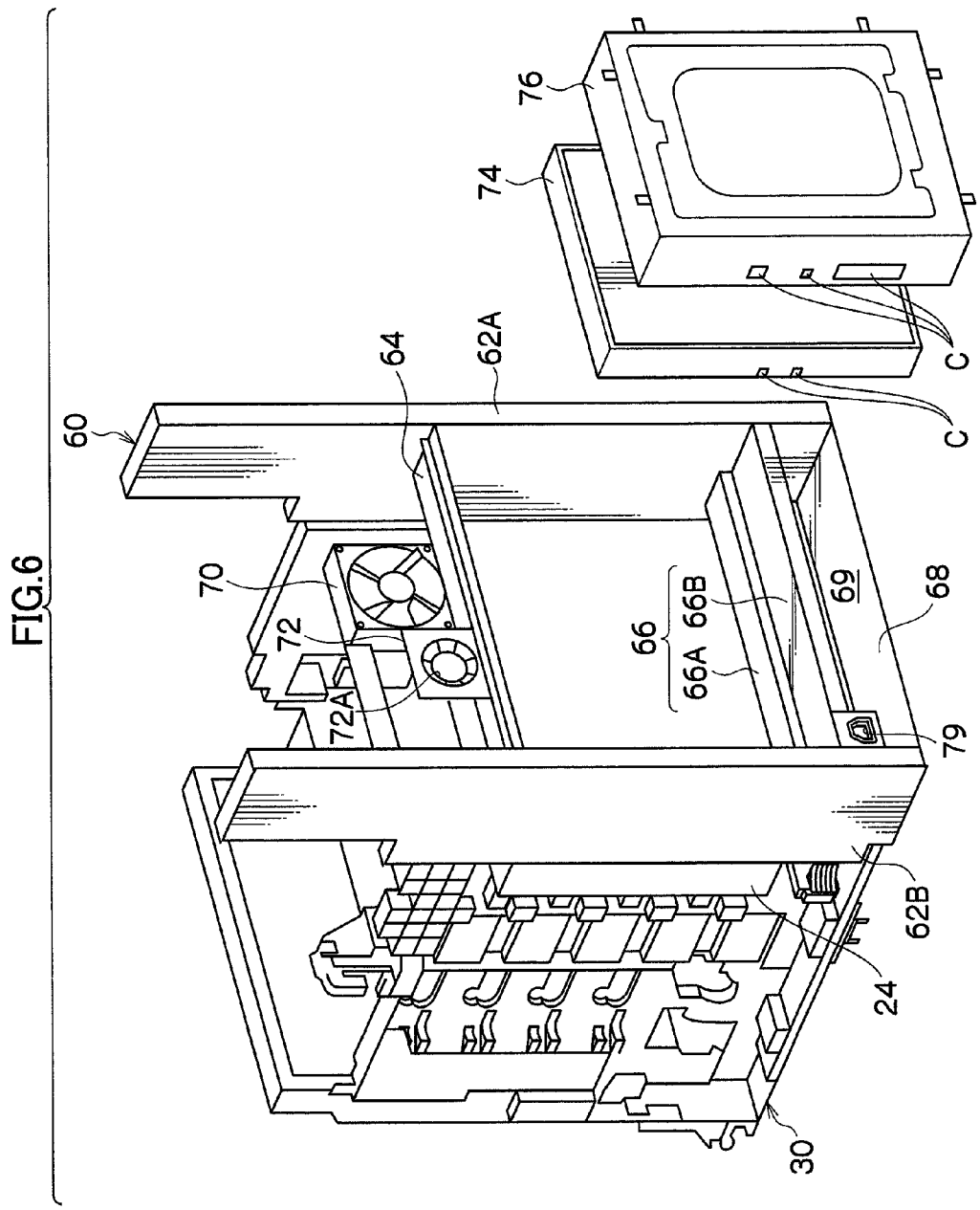
FIG. 6 is a perspective view showing a state in which the support body and the frame of the present embodiment are joined.

As shown in FIG. 6, the upper connection plate 64 is disposed upward relative to a vertical direction central portion of the support pillars 62A and 62B. A fan 70 and a sound output section structural plate 72 are mounted at the upper connection plate 64. The sound output section structural plate 72 is formed with a hole for sound output 72A. An opening (not shown) is formed in the device operation control section 24, in correspondence with an inspiration direction of the fan 70, and external air is blown into the device operation control section 24 by the fan 70.

Figure 7:
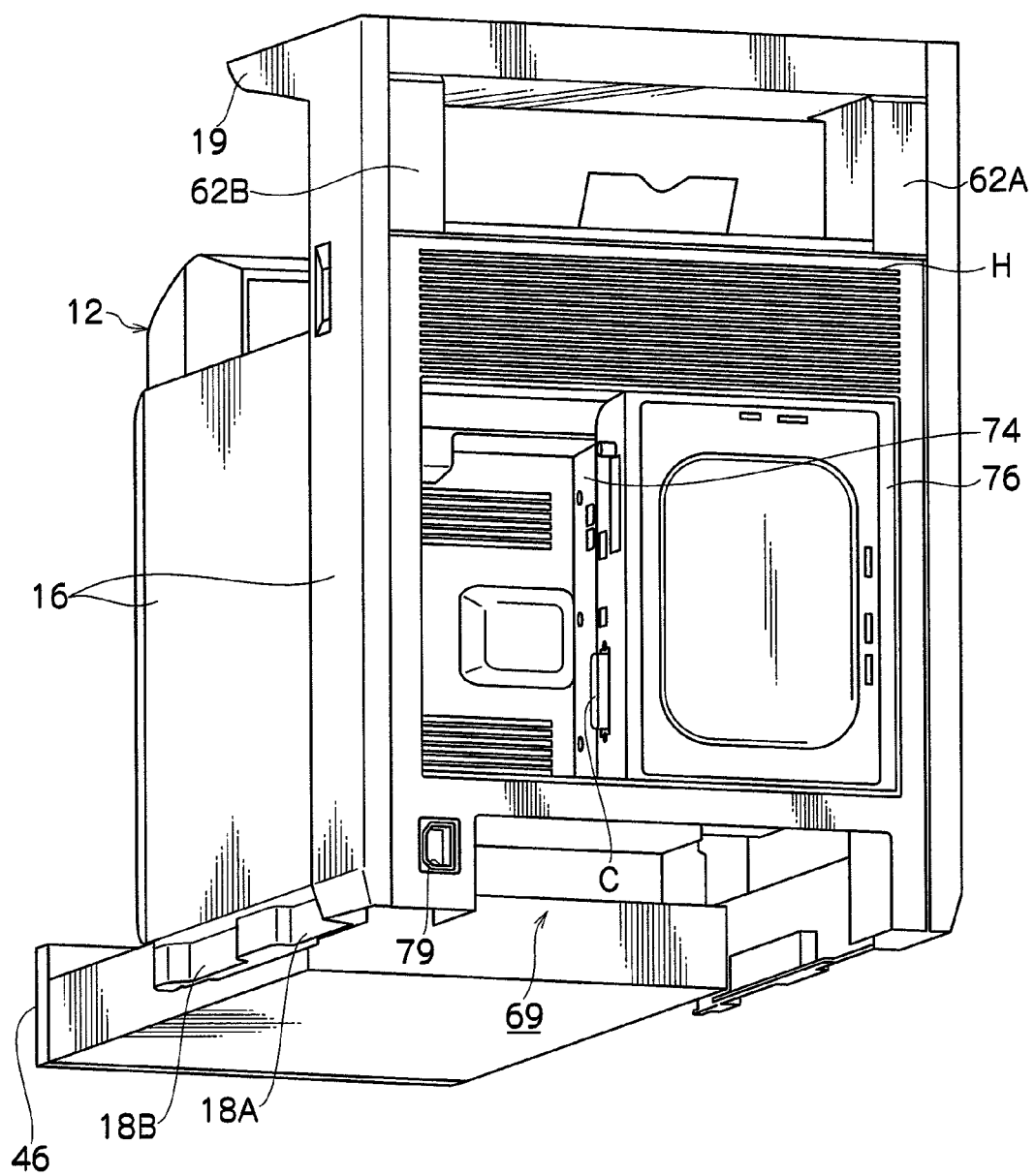
FIG. 7 is a perspective view, viewed from a rear face side, of a state in which various control units are disposed at the support body of the present embodiment.

The lower connection plate 66 is disposed downward relative to the vertical direction central portion of the support pillars 62A and 62B. The lower connection plate 66 features a step in the front-rear direction, and a first level 66A and a second level 66B are structured by this step. The first level 66A is disposed at a side of mounting of the image formation section 12, and is formed as a step which is higher than the second level 66B. As shown in FIG. 7, a multifunction controller unit 74 is disposed at the first level 66A, and a printer controller unit 76 is disposed at the second level 66B. Utilizing the vertical direction step between the first level 66A and the second level 66B, the multifunction controller unit 74 is mounted thereto from the rear face side by bolts or the like. Each of the controller units is structured by a circuit board and the like being disposed in a box-like chassis, and is provided with a connector for connection to external components.

The multifunction controller unit 74 is a control unit for implementing copier functions, fax functions and scanner functions, and a driving frequency of a CPU thereof will generally be high. In contrast, the device operation control section 24 and the printer controller unit 76, which implements printer functions, have comparatively low frequencies. Accordingly, the multifunction controller unit 74 with high frequencies and large amounts of noise is disposed to be sandwiched between the printer controller unit 76 and the device operation control section 24. That is, the various control units are arranged in the following order from an outermost side: the printer controller unit 76, the multifunction controller unit 74, and the device operation control section 24. Consequently, the circuit boards and chassis (metal plates) of the multifunction controller unit 74 and the device operation control section 24 function as electromagnetic shields. Thus, leakage of electromagnetic noise that is emitted from the multifunction controller unit 74 to the exterior and ingression of the electromagnetic noise into the interior of the device can be suppressed.

For the present embodiment, the multifunction controller unit 74 is disposed to be sandwiched between the printer controller unit 76 and the device operation control section 24. However, the multifunction controller unit 74 could be disposed to be sandwiched between the low-voltage supply section 28 and the printer controller unit 76.

Figure 8:
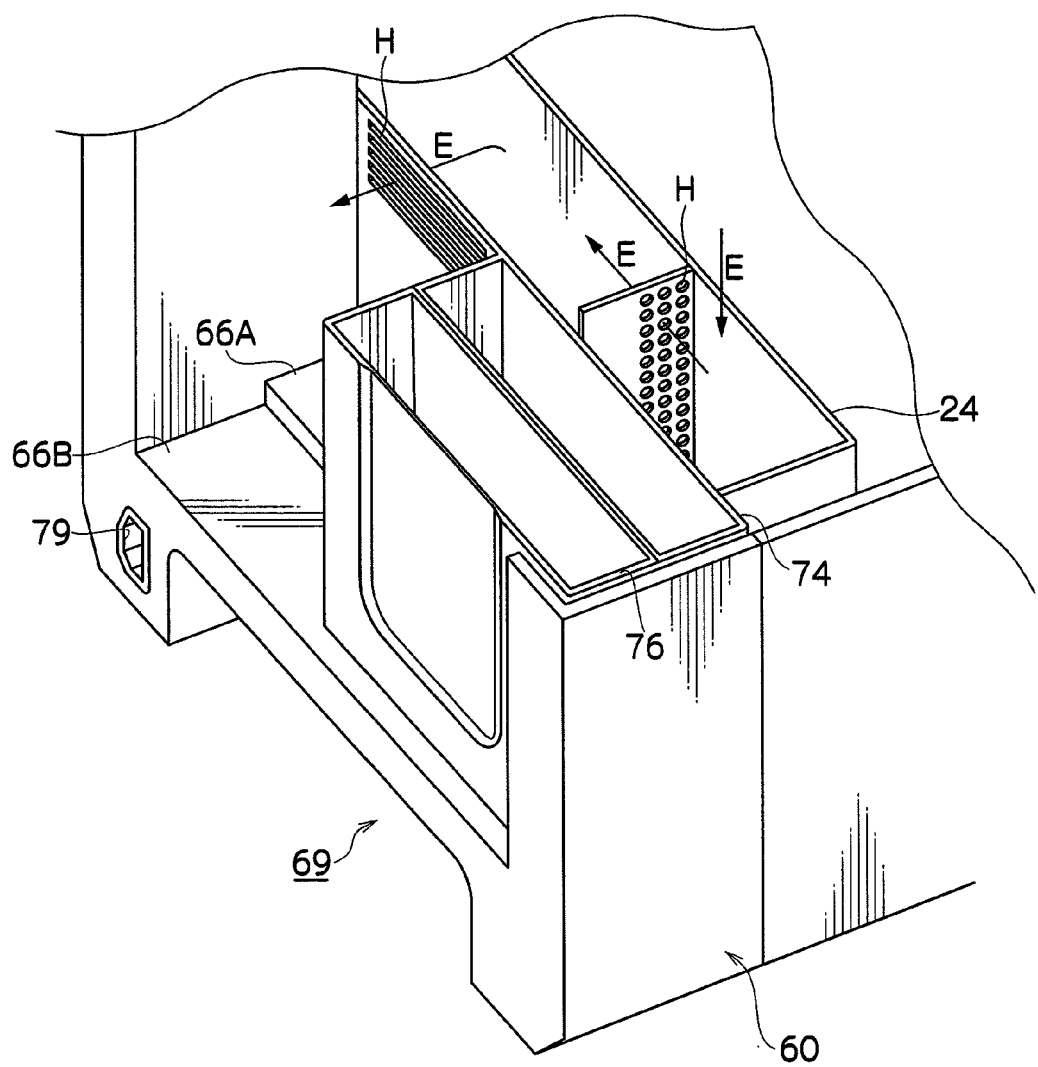
FIG. 8 is a view showing passage of air which is inspirated by a fan of the present embodiment.

As shown in FIG. 8, air that is inspirated into the device operation control section 24 by the fan 70 passes through ventilation openings H and flows in the direction shown by the arrows E, and is expirated to the exterior. The interior of the device operation control section 24 is cooled by the flow of this air.

Figure 9A:
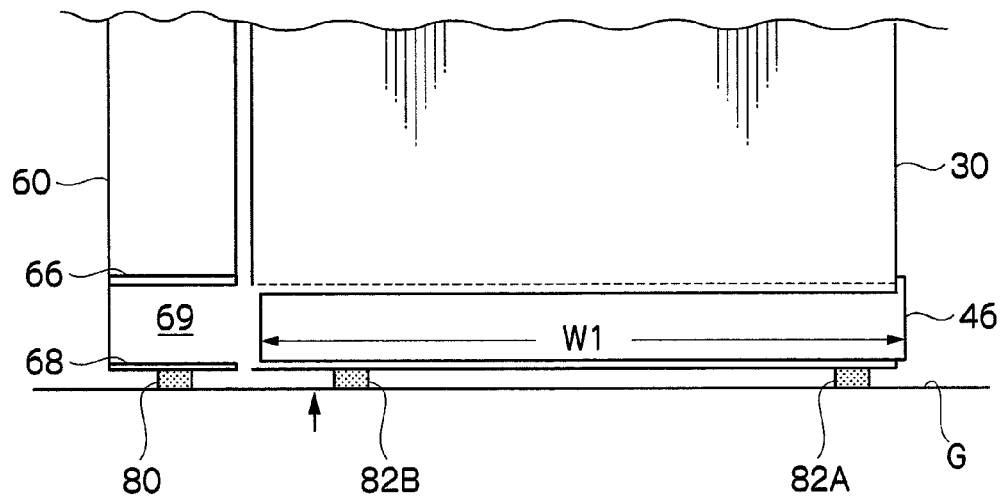
FIG. 9A is a view showing a relationship between the paper supply cassette with size W1 of the present embodiment and a cassette cavity.
Figure 9B:
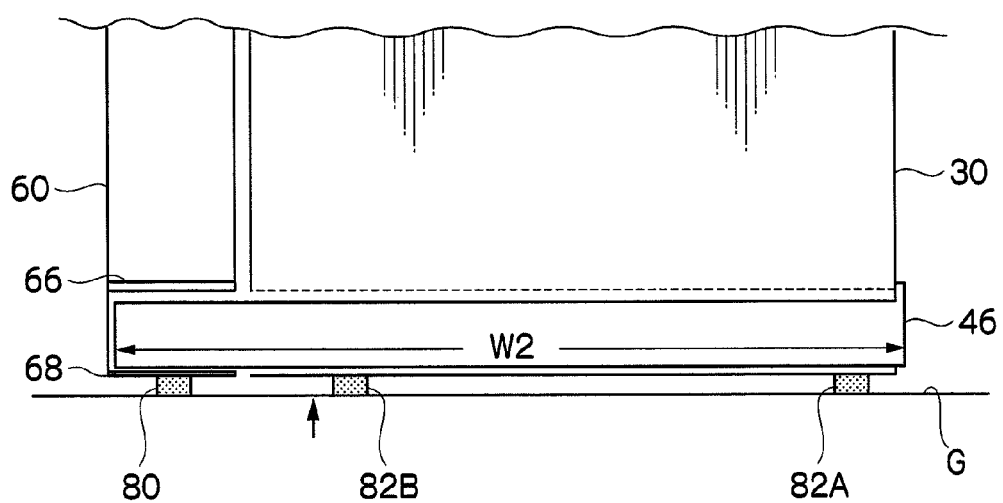
FIG. 9B is a view showing a relationship between the paper supply cassette with size W2 of the present embodiment and the cassette cavity.

The floor plate 68 is disposed at a floor portion of the support body 60. A cassette cavity 69, which is capable of accommodating the rear end portion of the paper supply cassette 46, is formed between the floor plate 68 and the lower connection plate 66. Thus, the cassette cavity 69 is structured by the support pillars 62A and 62B, the lower connection plate 66 and the floor plate 68. As shown in FIGS. 9A and 9B, when the size of the paper supply cassette 46 is W1, the rear end portion of the paper supply cassette 46 stays in the interior of the frame 30, and when the size of the paper supply cassette 46 is W2, the rear end portion protrudes from the frame 30 and is accommodated into the cassette cavity 69. Thus, the longitudinal direction length of the paper supply cassette 46 is accommodated by the cassette cavity 69. That is, the rear end of the paper supply cassette 46 is accommodated at a location utilizing the furtherward cavity structured by the support body 60. At this location, an upper portion of the paper supply cassette 46 is covered by the lower connection plate 66.

An inlet 79, for insertion of an electrical outlet, is formed at a lower side corner portion of the support body 60, which is structured by the second level 66B and the support pillar 62A.

As shown in FIG. 5, hole portions 63 are formed in the support pillars 62A and 62B at locations corresponding to the mounting portions 32 of the frame 30. The mounting portions 32 and the hole portions 63 constitute a shock-absorbing structure for absorbing vibrations from the image acquisition section 14.

As shown in FIG. 3, reinforcement members 78 are provided at the locations at which the mounting portions 32 are mounted to the hole portions 63. The reinforcement members 78 are formed in plate shapes, and are attached to the frame 30 and the support body 60 so as to bridge therebetween. The joining of the frame 30 with the support body 60 is reinforced by the reinforcement members 78.

However, the reinforcement members 78 need not necessarily be provided at four locations, and could be provided at the two lower side locations. In particular, because stronger forces act at the lower side from loads on the image acquisition section 14 and the like, reinforcement of the lower side is desirable.

First support portions 80 are provided at the lower side of the support body 60, and second support portions 82 are provided at the lower side of the frame 30. One each of the first support portions 80 are provided below the support pillar 62A and the support pillar 62B. Two of the second support portions 82 are provided at the front side of the frame 30, and two at the rear side (the support body 60 side) of the frame 30 (herebelow, the two at the front side are referred to as distant support portions 82A and the two at the rear side are referred to as proximate support portions 82B). A structure in which, when the image formation device 10 is disposed on a floor surface G, the proximate support portions 82B are withdrawn upward by pressure from the floor surface G is desirable, with the proximate support portions 82B being structured by soft members or mounted via springs or the like, such that the proximate support portions 82B do not protrude from a level plane constituted by the first support portions 80 and the distant support portions 82A and cause wobbling. If the image formation section 12 is to be employed alone, both the proximate support portions 82B and the distant support portions 82A are required for supporting the image formation section 12 at the floor surface G, but when the image formation section 12 is employed in combination with the image acquisition section 14, because the first support portions 80 are provided at the support body 60, the proximate support portions 82B are not necessarily required. Accordingly, the proximate support portions 82B may be formed as structures which are detachable from the frame 30 (for example, being fixed by bolts and removed from the frame 30 by detachment of the bolts, or the like).

As shown in FIGS. 1 and 7, the frame 30 and the support body 60 are covered with a casing 16. At lower portions of each of two side faces of this casing 16, first recess portions 18A, which serve as handles, are formed at locations corresponding to the support body 60. Further, second recess portions 18B to serve as handles are formed at the near side of the lower portions of the two side faces of the casing 16, in correspondence with the frame 30.

Horizontal support portions 19 are formed to the horizontal direction nearward side from an upper portion of the support body 60. The horizontal support portions 19 are cantilever supports for stably supporting the image acquisition section 14 at the support body 60.

As has been described above, according to the image formation device 10 of the present embodiment, the rear end portion of the paper supply cassette 46 can be accommodated into the cassette cavity 69 structured by the support body 60. Thus, even when the longitudinal direction length of the paper supply cassette 46 is long, a distance between a user and the image acquisition section 14 can be made shorter without the paper supply cassette 46 protruding at the near side of the image formation device 10, and convenience characteristics are improved.

Figure 10:
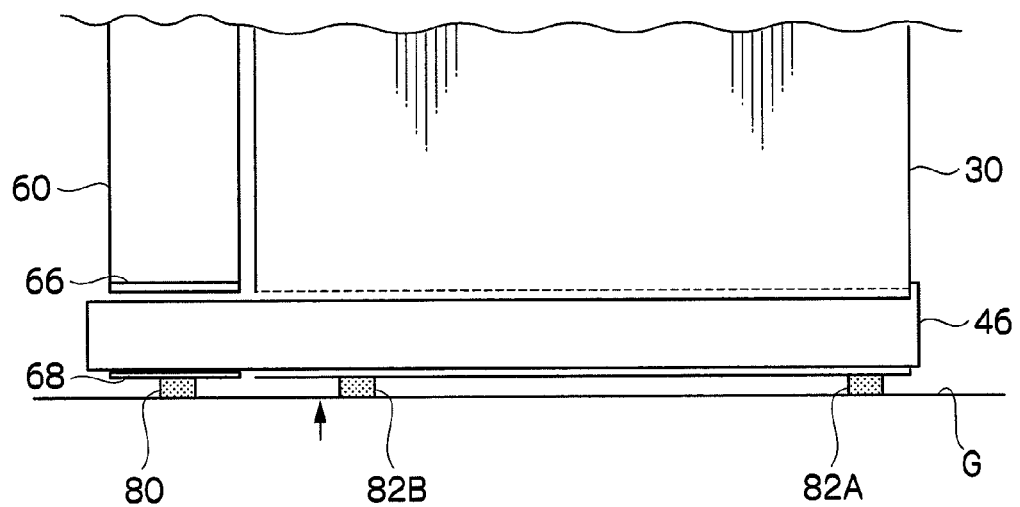
FIG. 10 is a view showing a relationship between a paper supply cassette and the cassette cavity in a variant example of the present embodiment.

Anyway, for the present embodiment, a case of longitudinal direction lengths of the paper supply cassette 46 being W1 and W2 has been described, but a cassette may be employed with which the longitudinal direction length of the paper supply cassette 46 is a length W3 which is longer than W2. In such a case, as shown in FIG. 10, the rear end portion of the paper supply cassette 46 is accommodated by being protruded from a rear face side of the support body 60.

Furthermore, in the present embodiment, the support pillars 62A and 62B of the support body 60 are disposed at the rear face side of the frame 30, but the support pillars 62A and 62B may be disposed at a side face of the frame 30. In such a case, the printer controller unit 76 and the multifunction controller unit 74 are disposed in the frame 30.

Further still, for the present embodiment, an example has been described in which the support body 60 is structured to include the upper connection plate 64, lower connection plate 66 and floor plate 68 which are arranged in the horizontal direction. However, these members are not necessarily required, and the support body 60 could be structured with the support pillars 62A and 62B alone.

What is claimed is:

1. An image formation device comprising:
    an image formation section which forms an image at a recording medium;
    an image acquisition section which is disposed at an upper side relative to the image formation section;
    a paper supply cassette which is disposed at a lower side relative to the image formation section and can be drawn out to a near side; and
    a support body which supports the image acquisition section and forms a cassette cavity capable of accommodating a far side of the paper supply cassette,
    wherein the support body comprises a pair of support pillars and the cassette cavity is capable of accommodating the far side of the paper supply cassette between the pair of support pillars.

2. The image formation device of claim 1, wherein the support body is disposed at a rear face side of the image formation section.

3. The image formation device of claim 2, wherein the support body comprises a pair of support pillars, which are disposed with a spacing therebetween, and a support pillar connection member, which connects the two support pillars to one another.

4. The image formation device of claim 3, wherein the two support pillars are disposed at two side face portions of the image formation section.

5. The image formation device of claim 4, wherein the support pillar connection member forms an upper portion of the cassette cavity and is disposed at a location covering an upper face of the paper supply cassette.

6. The image formation device of claim 2, wherein the cassette cavity penetrates through the support body in a front-rear direction such that the far side of the paper supply cassette can pass therethrough.

7. The image formation device of claim 2, further comprising a control unit which controls at least one of the image formation section and the image acquisition section, and is disposed at the support body at an upper side relative to the cassette cavity.

8. The image formation device of claim 7, wherein the control unit comprises an image formation control section which controls a function of the image formation section, an image acquisition control section which controls a function of the image acquisition section, and a driving control section which controls driving of the image formation section,
    and the image formation control section is disposed on a side of the image acquisition control section closer to the outside of image formation device and the driving control section is disposed on an other side of the image acquisition control section.

9. The image formation device of claim 1, wherein the support body comprises a pair of support pillars, which are disposed with a spacing therebetween, and a support pillar connection member, which connects the two support pillars to one another.

10. The image formation device of claim 9, wherein the two support pillars are disposed at two side face portions of the image formation section.

11. The image formation device of claim 10, wherein the support pillar connection member forms an upper portion of the cassette cavity and is disposed at a location covering an upper face of the paper supply cassette.

12. The image formation device of claim 1, wherein the cassette cavity penetrates through the support body in a front-rear direction such that the far side of the paper supply cassette can pass therethrough.

13. The image formation device of claim 1, further comprising a control unit which controls at least one of the image formation section and the image acquisition section, and is disposed at the support body at an upper side relative to the cassette cavity.

14. The image formation device of claim 13, wherein the control unit comprises an image formation control section which controls a function of the image formation section, an image acquisition control section which controls a function of the image acquisition section, and a driving control section which controls driving of the image formation section,
    and the image formation control section is disposed on a side of the image acquisition control section closer to the outside of image formation device and the driving control section is disposed on an other side of the image acquisition control section.

15. The image formation device of claim 1, wherein the cassette cavity is capable of accommodating different paper supply cassettes having different sizes from each other.

16. A support body, wherein the support body
    supports an image acquisition section, the image acquisition section being disposed at an upper side relative to an image formation section, and
    forms a cassette cavity capable of accommodating a far side of a paper supply cassette, which paper supply cassette is disposed at a lower side relative to the image formation section and can be drawn out to a near side,
    wherein the support body comprises a pair of support pillars and the cassette cavity is capable of accommodating the far side of the paper supply cassette between the pair of support pillars.

17. The support body of claim 16, wherein the support body is disposed at a rear face side of the image formation section.

18. The support body of claim 17, wherein the support body comprises a pair of support pillars, which are disposed with a spacing therebetween, and a support pillar connection member, which connects the two support pillars to one another.

19. The support body of claim 18, wherein the two support pillars are disposed at two side face portions of the image formation section.

20. The support body of claim 18, wherein the support pillar connection member forms an upper portion of the cassette cavity and is disposed at a location covering an upper face of the paper supply cassette.

21. The support body of claim 17, wherein the cassette cavity penetrates therethrough in a front-rear direction such that a rear end portion of the paper supply cassette can pass therethrough.

22. The support body of claim 16, wherein the support body comprises a pair of support pillars, which are disposed with a spacing therebetween, and a support pillar connection member, which connects the two support pillars to one another.

23. The support body of claim 22, wherein the two support pillars are disposed at two side face portions of the image formation section.

24. The support body of claim 22, wherein the support pillar connection member forms an upper portion of the cassette cavity and is disposed at a location covering an upper face of the paper supply cassette.

25. The support body of claim 16, wherein the cassette cavity penetrates therethrough in a front-rear direction such that a rear end portion of the paper supply cassette can pass therethrough.

* * * * *